United States Patent
Shi et al.

(10) Patent No.: US 9,455,821 B2
(45) Date of Patent: Sep. 27, 2016

(54) METHOD, SYSTEM, AND APPARATUS FOR DYNAMICALLY ADJUSTING LINK

(71) Applicant: Huawei Technologies Co., Ltd., Shenzhen (CN)

(72) Inventors: Yongjie Shi, Shenzhen (CN); Tao Lin, Shenzhen (CN); Xiaodong Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 14/098,683

(22) Filed: Dec. 6, 2013

(65) Prior Publication Data

US 2014/0093022 A1    Apr. 3, 2014

Related U.S. Application Data

(63) Continuation of application No. PCT/CN2011/075468, filed on Jun. 8, 2011.

(51) Int. Cl.
*H04J 3/16* (2006.01)
*H04L 7/00* (2006.01)
*H04L 12/24* (2006.01)

(52) U.S. Cl.
CPC ........... *H04L 7/0012* (2013.01); *H04L 41/085* (2013.01); *H04L 41/0816* (2013.01); *H04L 41/0866* (2013.01); *H04L 41/0876* (2013.01); *H04L 41/0896* (2013.01)

(58) Field of Classification Search
CPC .. H04L 29/06163; H04L 1/0001; H04J 3/16; H04J 3/1682
See application file for complete search history.

(56) References Cited

U.S. PATENT DOCUMENTS

| | | | | |
|---|---|---|---|---|
| 6,202,094 B1* | 3/2001 | Grosser, Jr. | ......... | H04L 12/2856 340/2.1 |
| 6,751,193 B1* | 6/2004 | Kudrimoti | ............ | H04W 28/14 370/231 |

(Continued)

FOREIGN PATENT DOCUMENTS

| | | |
|---|---|---|
| CN | 101005405 A | 7/2007 |
| CN | 101510847 A | 8/2009 |

(Continued)

*Primary Examiner* — Hassan Phillips
*Assistant Examiner* — Siren Wei
(74) *Attorney, Agent, or Firm* — Huawei Technologies Co., Ltd.

(57) ABSTRACT

A method, a system, and an apparatus for dynamically adjusting a link, where the method includes: determining, by a transmitting end, link adjustment information according to the data traffic change when detecting a change of data traffic, where the link adjustment information contains the number of required working links; and adjusting, by the transmitting end, the number of working links on an interface of the transmitting end according to the determined link adjustment information, and sending a configuration request to a receiving end, where the configuration request includes the link adjustment information; and after receiving the configuration request, adjusting, by the receiving end, the number of working links on an interface of the receiving end according to the configuration request. In the embodiments of the present invention, data transmission on an original working link is not affected, thereby saving bandwidth and power consumption.

12 Claims, 7 Drawing Sheets

(56) References Cited

U.S. PATENT DOCUMENTS

| | | | | |
|---|---|---|---|---|
| 7,210,090 B1* | 4/2007 | Stenfort | .................. | H04L 67/00 |
| | | | | 714/758 |
| 8,161,429 B1* | 4/2012 | Chan | .................... | G06F 17/5045 |
| | | | | 716/100 |
| 2008/0101396 A1* | 5/2008 | Miyata | .................... | H04L 12/66 |
| | | | | 370/408 |
| 2008/0247420 A1* | 10/2008 | Marks | ............... | H04L 12/40006 |
| | | | | 370/475 |
| 2009/0003229 A1* | 1/2009 | Loh | .................... | H04L 41/0833 |
| | | | | 370/252 |
| 2009/0122811 A1 | 5/2009 | Wu | | |
| 2009/0196172 A1* | 8/2009 | Long | ..................... | H04L 12/437 |
| | | | | 370/225 |
| 2011/0016374 A1* | 1/2011 | Grivna | ................ | G06F 11/1016 |
| | | | | 714/807 |
| 2011/0229126 A1* | 9/2011 | Gerstel | ............... | H04L 41/0896 |
| | | | | 398/25 |

FOREIGN PATENT DOCUMENTS

| | | |
|---|---|---|
| CN | 101834758 A | 9/2010 |
| WO | 2008074211 A1 | 6/2008 |

\* cited by examiner

METHOD, SYSTEM, AND APPARATUS FOR DYNAMICALLY ADJUSTING LINK

CROSS-REFERENCE TO RELATED APPLICATIONS

This application is a continuation of International Application No. PCT/CN2011/075468, filed on Jun. 8, 2011, which is hereby incorporated by reference in their entireties.

TECHNICAL FIELD

The present invention relates to the field of data transmission, and in particular, to a method, a system, and an apparatus for dynamically adjusting a link.

BACKGROUND

With the fast development of communication and chip technologies, bandwidth requirements for data exchange between chips are greater and greater. However, due to encapsulation limitation and interference between buses, it is impossible to increase the width of a parallel bus unlimitedly to improve signal transmission bandwidth. In this case, a high-speed serial link technology is developed rapidly, where a component implementing serial-parallel conversion and parallel-serial conversion of data is generally referred to as a Serializer and Deserializer (SerDes).

Interlaken is an optimized interconnection protocol to achieve high bandwidth and reliable packet transmission, and the protocol uses multiple SerDes links to establish a logical connection between components and improve the performance of a communication device by using multi-channel, an anti-pressure capability, and data integrity protection. A series of a configurable number of SerDes links may be used in an Interlaken interconnection protocol to transmit data; therefore, the transmission efficiency is high, expansibility and flexibility are strong, and security and reliability are guaranteed. No upper limit is set for the bus capacity in theory and the bus capacity can be adjusted automatically according to user requirements, and therefore, becomes a preferred choice of next generation communications devices.

Figure 1:
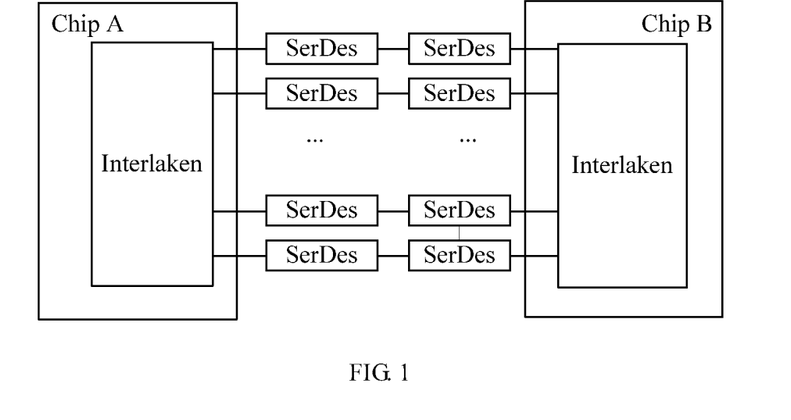
FIG. 1 is a schematic diagram in which chips are interconnected through an Interlaken interface.

FIG. 1 is a schematic diagram in which chips are interconnected through an Interlaken interface. The bandwidth of the interface needs to be determined before connection of the chips, and a proper SerDes speed needs to be selected at the same time, thereby determining a proper number of SerDes links. Each SerDes link is a data channel, and data is transmitted on the SerDes links in parallel.

During the implementation of the present invention, the inventors find that, in an actual application, with the continuous increase of the bandwidth of a device, the number of required SerDeses is increased too. The ratio of power consumption of the SerDes in power consumption of all chips is greater and greater, especially for a router product. The data traffic change in each time segment is also great, and traffic between chips in many time segments is not half of the bandwidth of an interface. Once data between chips starts to be transmitted, regardless of a change of data traffic between chips, all SerDes links work normally, and the number of links cannot be changed, which results in a great waste of the bandwidth of the interface and a waste of the whole power consumption of the chips.

For the situation, in the prior art, in order to reduce or increase the number of SerDes links in working, data can only be re-transmitted after the data traffic between the chips is interrupted, the interface is re-configured, and the SerDes links are re-synchronized and re-aligned. In the existing solution, not only the data traffic needs to be interrupted, but also time required for re-synchronization and re-alignment is long.

SUMMARY

Embodiments of the present invention provide a method, a system, and an apparatus for dynamically adjusting a link, which can dynamically adjust the number of working links with a change of data traffic without interrupting the data traffic.

An embodiment of the present invention provides a method for dynamically adjusting a link, including: when detecting a change of data traffic, determining, by a transmitting end, link adjustment information according to the data traffic change, where the link adjustment information contains the number of required working links; adjusting, by the transmitting end, the number of working links on an interface of the transmitting end according to the determined link adjustment information, and sending a configuration request to a receiving end, where the configuration request includes the link adjustment information; and after receiving the configuration request, adjusting, by the receiving end, the number of working links on an interface of the receiving end according to the configuration request.

An embodiment of the present invention provides a system for dynamically adjusting a link, including a transmitting end configured to when detecting a change of data traffic, determine link adjustment information according to the data traffic change, adjust the number of working links on an interface of the transmitting end according to the determined link adjustment information, and send a configuration request to a receiving end, where the configuration request includes the link adjustment information, and the link adjustment information contains the number of required working links; and the receiving end configured to adjust the number of working links on an interface of the receiving end according to the configuration request after receiving the configuration request.

An embodiment of the present invention provides an apparatus for dynamically adjusting a link, including: a detection unit configured to detect a data traffic change; a link adjustment information determining unit configured to determine link adjustment information according to the data traffic change when the change of the data traffic is detected, where the link adjustment information contains the number M of required working links; and a transmitting unit configured to send a configuration request to a receiving end, so that the receiving end is capable of adjusting the number of working links on an interface of the receiving end according to the configuration request, where the configuration request includes the link adjustment information.

In the embodiments of the present invention, the number of working links is adjusted when the change of the data traffic is detected, and during the adjustment of the number of working links, data transmission on an original working link is not affected, thereby saving bandwidth and power consumption.

DESCRIPTION OF EMBODIMENTS

Technical solutions in the present invention are described in detail with reference to the accompanying drawings and the embodiments.

Figure 2:
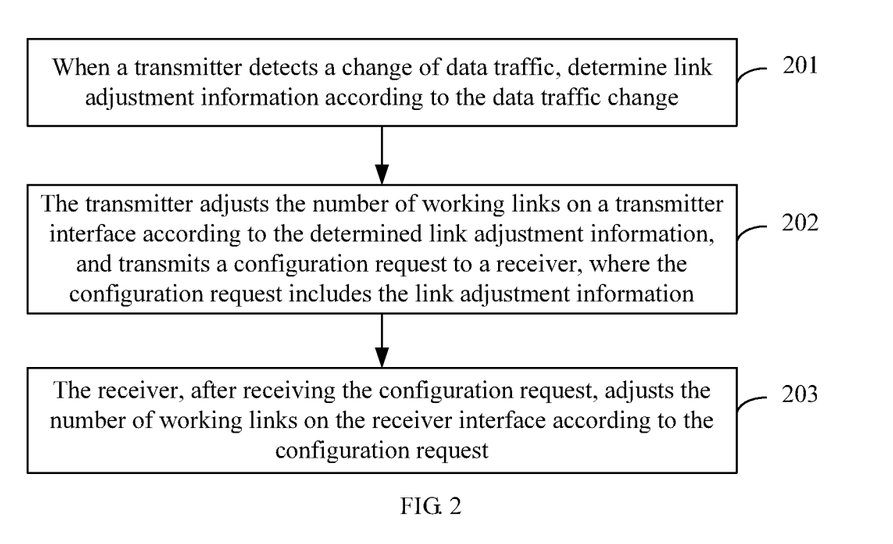
FIG. 2 is a schematic flow chart of a first method embodiment in the present invention.

As shown in FIG. 2, an embodiment of the present invention provides a method for dynamically adjusting a link, which includes the following steps.

Step 201: When detecting a change of data traffic, a transmitting end determines link adjustment information according to the data traffic change. The link adjustment information contains the number of required working links.

Step 202: The transmitting end adjusts the number of working links on an interface of the transmitting end according to the link adjustment information determined in step 201, and sends a configuration request to a receiving end, where the configuration request includes the link adjustment information.

Step 203: After receiving the configuration request, the receiving end adjusts the number of working links on an interface of the receiving end according to the configuration request.

In the embodiment of the present invention, the interface of the transmitting end and the interface of the receiving end may be input/output interfaces connected to two or more than two physical SerDes links, and specifically may be an Interlaken interface, a Peripheral Component Interconnect Express (PCI-E) interface, a Memory interface, or the like. The link in the embodiment of the present invention specifically refers to a physical SerDes link.

Figure 3:
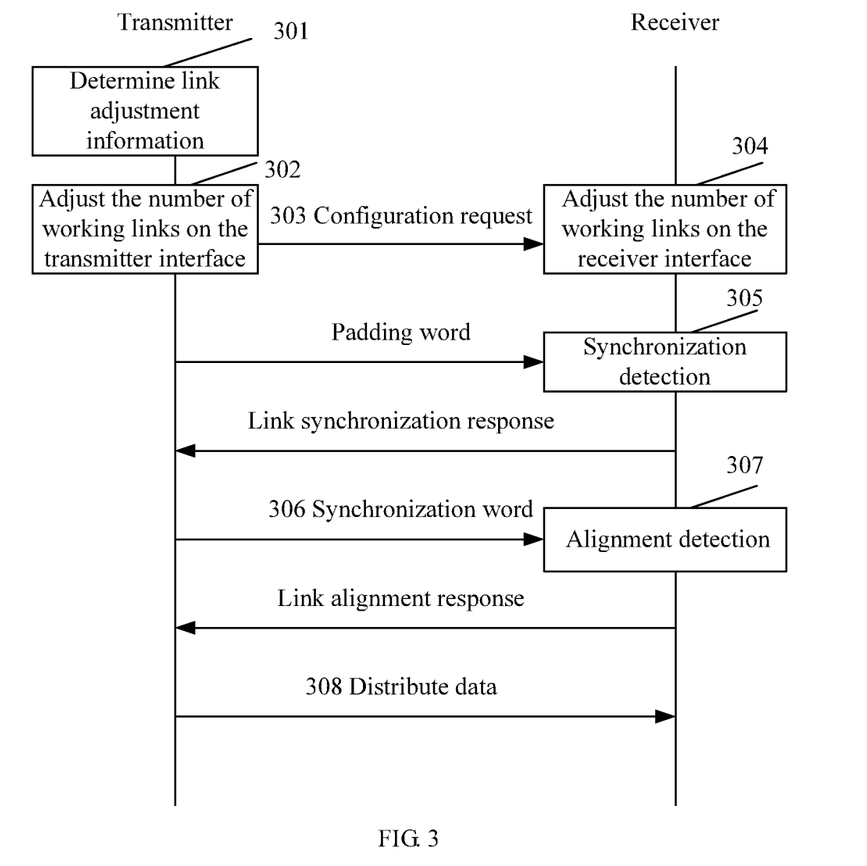
FIG. 3 is a schematic flow chart of a second method embodiment in the present invention.

Take that the number of working links needs to be increased for example. As shown in FIG. 3, an embodiment of the present invention provides a method for dynamically adjusting a link, which includes the following steps.

Step 301: When detecting a change of data traffic, a transmitting end determines link adjustment information according to the data traffic change. The link adjustment information contains the number M of required working links. In this embodiment, the number M of required working links is greater than the number N of current working links. In this embodiment, M is the number of required working links, N is the number of current working links, M>N, N≥1, and M−N is the number of newly enabled links.

In order to improve reliability, before the link adjustment information is determined, whether all links work normally is confirmed, and if a failed link appears, the number of normal working links is determined. In this embodiment, the number of normal working links is at least 1.

Step 302: The transmitting end adjusts the number of working links on an interface of the transmitting end according to the determined link adjustment information, and if the number M of required working links is greater than the number N of current working links, enables M−N links.

Before adjusting the number of working links on the interface of the transmitting end, the transmitting end may further detect validity of the link adjustment information, for example, judge whether the number of required working links that is contained in the link adjustment information is smaller than or equal to the number of current available links, and when the number of required working links is smaller than or equal to the number of current available links, confirm that the link adjustment information is valid; otherwise, when the number of required working links is greater than the number of current available links, confirm that the link adjustment information is invalid. The number of working links is adjusted on the interface of the transmitting end only when the link adjustment information is valid. If the link adjustment information is invalid, the link adjustment information needs to be determined again.

Step 303: The transmitting end sends a configuration request to a receiving end, where the configuration request includes the link adjustment information. Step 303 and step 302 are not subject to a time sequence, and may be performed synchronously.

Specifically, the transmitting end may insert the configuration request into a control word of a normal working link to send to the receiving end.

Step 304: After receiving the configuration request, the receiving end adjusts the number of working links on an interface of the receiving end according to the configuration request, and if the number M of required working links is greater than the number N of current working links, enables M−N links.

Generally, in initial configuration, it is agreed to enable from a minimum link number when links are enabled. In this way, the transmitting end and the receiving end are capable of ensuring that a same link is enabled. For example, currently, a total of 23 links are in a normal working state, and if a link needs to be newly enabled, the transmitting end and the receiving end both enable a link 24.

In order to avoid data transmission errors, after receiving the configuration request, the receiving end may perform cyclic redundancy check (CRC) on the configuration request. When the CRC check is correct, the receiving end adjusts the number of working links on the interface of the receiving end according to the configuration request. In order to further improve the reliability, the transmitting end may continuously send the configuration request to the receiving end, and the receiving end is preset to adjust the number of working links on the interface of the receiving end according to the configuration request after receiving successive and consistent K configuration requests with the CRC check is correct. If the CRC check is erroneous, the configuration request is neglected. After the receiving end completes the adjustment of the number of working links on the interface of the receiving end according to the configuration request, if the receiving end receives the same configuration request, the receiving end neglects the same configuration request.

Step 305: After enabling the M−N new links, the receiving end performs synchronization detection on the M links, and continuously returns a link synchronization response to the transmitting end, where the link synchronization response contain currently synchronized link information. In this embodiment, the synchronization detection refers to each link that detects data on this link independently, determines an initial location of each sending byte from a serial bit stream, and keeps a receiving speed the same as a transmission speed of the transmitting end.

After enabling the M−N new links, the transmitting end sends padding words (stuff word) on the M−N newly enabled links, where the padding words are control words in a special format. The receiving end may perform identification when receiving the padding words. The receiving end performs the synchronization detection by using the padding words sent by the transmitting end, and deletes the padding words after completing the synchronization detection.

That the receiving end continuously returns the currently synchronized link information to the transmitting end refers to before synchronization of the newly enabled link is completed, the currently synchronized link information returned from the receiving end to the transmitting end is the number N of current working links, after synchronization of a newly enabled link is completed, the currently synchronized link information returned from the receiving end to the transmitting end is N+1, and after synchronization of two newly enabled links is completed, the currently synchronized link information returned from the receiving end to the transmitting end is N+2, and the rest may be deduced by analogy until synchronization of all newly enabled links is completed, and the currently synchronized link information returned from the receiving end to the transmitting end is M. For example, when the number of current working links is 12, and the number of required working links is 16, it is assumed that the links are numbered by lane 0, lane 1, lane 2, . . . , lane 15, lane 12, lane 13, lane 14, lane 15 are newly enabled links. Before synchronization of the newly enabled links lane 12, lane 13, lane 14, and lane 15 is completed, the currently synchronized link information sent from the receiving end to the transmitting end at this time is 12. After lane 14 is synchronized, the currently synchronized link information sent from the receiving end to the transmitting end at this time is 13. After lane 15 is synchronized, the currently synchronized link information sent from the receiving end to the transmitting end at this time is 14, and the rest may be deduced by analogy, after synchronization of all the newly enabled links lane 12, lane 13, lane 14, and lane 15 is completed, the currently synchronized link information sent from the receiving end to the transmitting end is 16.

Step 306: When the currently synchronized link information received by the transmitting end for a preset number of times is the number M of required working links, insert the synchronization word into the M working links in a preset period T, where the synchronization word is used by the receiving end to detect link alignment. In this embodiment, the preset period may be a detection period configured when the transmitting end and the receiving end are initialized.

The synchronization word is defined by an Interlaken protocol, and may be distinguished from normal data. The receiving end may delete the synchronization word after completing alignment detection.

When at least one newly enabled link fails, the link cannot be synchronized at the receiving end, so that the currently synchronized link information received by the transmitting end is always smaller than the number M of required working links. A time segment t may be preset, and if in a preset time segment t, the currently synchronized link information received by the transmitting end is always smaller than the number M of required working links, an alarm indication is sent indicating removal or repair of the failed link, and the failed link may specifically be removed in a mapping manner.

Step 307: The receiving end detects, in a preset period T, whether a same synchronization word appears in the M working links at the same moment, when detecting the same synchronization word in the M working links at the same moment for a preset number S of times, completes alignment detection, and sends a link alignment response to the transmitting end.

The preset number S of times is more reliable when it is greater. However, time required for the alignment detection increases accordingly, and may be set according to specific requirements.

As the link synchronization response, the link alignment response may be carried in the control word to send to the transmitting end.

Step 308: After receiving the link alignment response, the transmitting end distributes data to the M working links, and stops inserting the synchronization word into the M working links.

After detecting that sending of the synchronization word is stopped, the receiving end stops returning the link alignment response.

In addition, a timer may be set at the transmitting end, and a maximum time of link adjustment is set. If link adjustment fails to be completed in the set maximum time of link adjustment, the process returns to step 301, and the link adjustment information is determined according to the data traffic change again.

Figure 4:
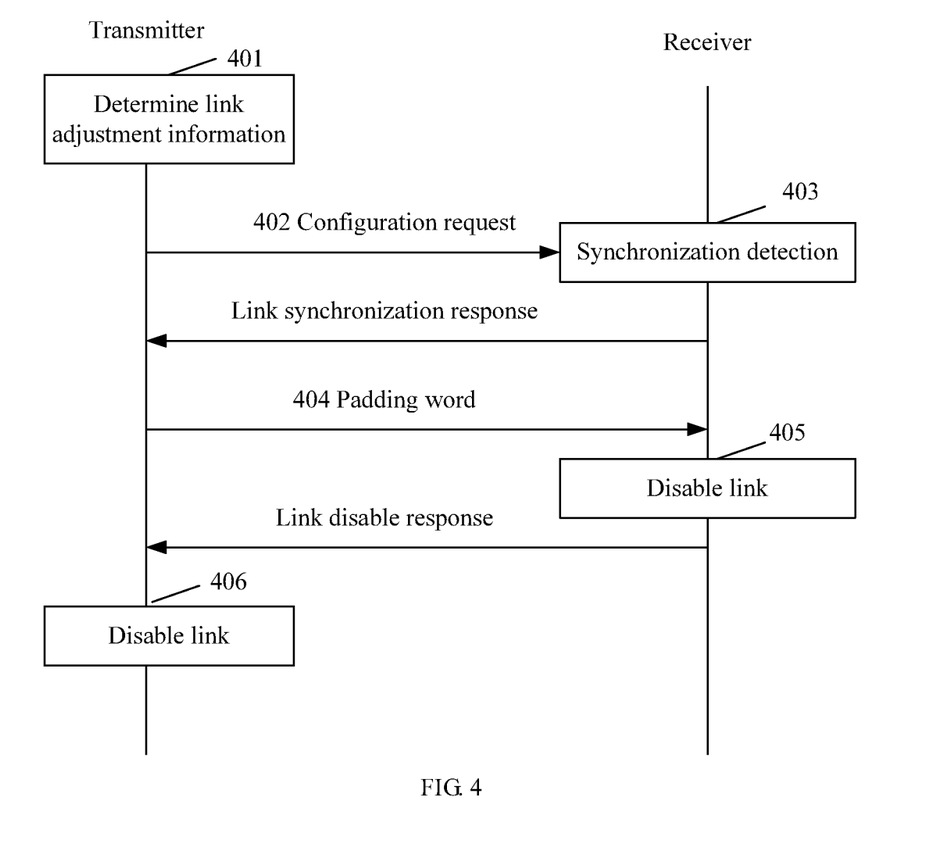
FIG. 4 is a schematic flow chart of a third method embodiment in the present invention.

Take that the number of working links needs to be decreased for example in the following. As shown in FIG. 4, a method for dynamically adjusting a link in an embodiment of the present invention includes:

Step 401: After detecting a change of data traffic, a transmitting end determines link adjustment information according to the data traffic change. The link adjustment information contains the number M of required working links. In this embodiment, the number M of required working links is smaller than the number N of current working links. In this embodiment, M is the number of required working links, N is the number of current working links, M<N, M≥1, and N−M is the number of newly disabled links.

In order to improve reliability, before the link adjustment information is determined, whether all links work normally needs to be confirmed. If a failed link appears, the number of normal working links is determined. In this embodiment, the number of normal working links is at least 1.

Step 402: The transmitting end sends a configuration request to a receiving end, where the configuration request includes the link adjustment information.

Specifically, the transmitting end may insert the configuration request into a control word of a normal working link to send to the receiving end.

Before adjusting the number of working links on an interface of the transmitting end, the transmitting end may further detect validity of the link adjustment information, for example, judge whether the number of required working links that is contained in the link adjustment information is smaller than or equal to the number of current available links, and when the number of required working links is smaller than or equal to the number of current available links, confirm that the link adjustment information is valid; otherwise, when the number of required working links is greater than the number of current available links, confirm that the link adjustment information is invalid. The number of working links is adjusted on the interface of the transmitting end only when the link adjustment information is valid. If the link adjustment information is invalid, the link adjustment information needs to be determined again.

Step 403: After receiving the configuration request, the receiving end performs synchronization detection on the M links, and continuously return a link synchronization response to the transmitting end, where the link synchronization response contain currently synchronized link information.

The M links are normal working links, and are in a synchronization state; therefore, the currently synchronized link information continuously returned from the receiving end to the transmitting end is the number M of required working links.

In order to avoid data transmission errors, after receiving the configuration request, the receiving end may perform CRC check on the configuration request. When the CRC check is correct, the synchronization detection is performed on the M links. In order to further improve reliability, the transmitting end may continuously send the configuration request to the receiving end, and the receiving end is preset to perform the synchronization detection on the M links after receiving successive and consistent K configuration requests with the CRC check being correct. If the CRC check is erroneous, the configuration request is neglected. After the receiving end returns the current synchronized link information to the transmitting end, if the receiving end receives the same configuration request, the receiving end neglects the same configuration request.

Step 404: When the currently synchronized link information received by the transmitting end for a preset number of times is the number M of required working links, stop distributing data to N−M links to be disabled, and send padding words on the N−M links to be disabled.

Step 405: When the padding words are successively received for a preset number of times on a link, the receiving end stops receiving data from the link, disables the link, and continuously sends the link disable response to the transmitting end, where the link disable response may contain the number of current normal working links.

Generally, in initial configuration, it is agreed to disable from a maximum link number when links are disabled. In this way, the transmitting end and the receiving end are capable of ensuring that a same link is disabled. For example, a total of 23 links are in a normal working state, and if a link needs to be disabled, the transmitting end and the receiving end both disable a link 23.

The receiving end may delete the received padding words after disabling the link.

Step 406: When the number of current normal working links that is contained in the link disable response received by the transmitting end for a preset number of times is the number M of required working links, disable the N−M links to be disabled.

In the embodiment of the present invention, the configuration request, the link synchronization response, a link alignment response, the link disable response may be sent to the receiving end by inserting them into the control word of the normal working link, where the format may be shown in Table 1:

TABLE 1

| Bit 7 | Bit 6 | Bit 5 | Bit 4 | Bit 3 | Bit 2 | Bit 1 | Bit 0 |
|---|---|---|---|---|---|---|---|
| Reserved | Instruction code | | Link information | | | | |

The configuration request, the link synchronization response, the link alignment response, and the link disable response may use an 8-bit field, and the definition of each field is as follows:

Bit[6:5]: an instruction code, transferring control information:
    00: Link disable-enable request
    01: Link synchronization response
    10: Link alignment response
    11: Link disable response; and Bit[4:0]: link information, at most 32 types of link configuration are allowed, where value 0 corresponds to a minimum number of links allowed to be used.

The value represents the following link information:
    5'h0: minimum number of links (MIN_LANE)
    5'h 1: MIN_LANE+1
    5'h 2: MIN_LANE+2
    . . .
    5'h 31: MIN_LANE+31

Herein, 0 represents a minimum number of normal working links rather than represents a link not working normally, as the configuration request and the response information need to be transferred through a normal working link, at least one normal working link is required to transfer the information, which cannot be represented as 0; the specific minimum number of the required normal working links is determined according to actual requirements. Definitely, the configuration request and the response information may also be transferred through other manners, for example, an independent interface, and then the minimum number of normal working links may be 0.

Figure 5:
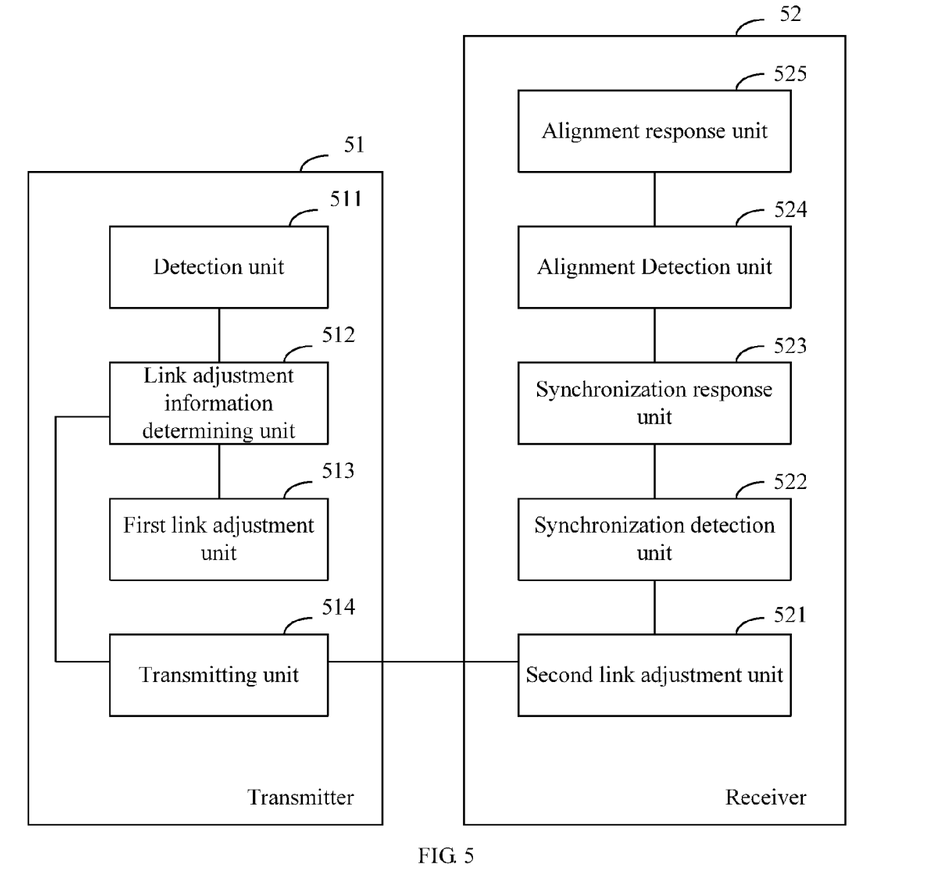
FIG. 5 is a schematic structural diagram of a first system embodiment in the present invention.

FIG. 5 shows an embodiment of a system for dynamically adjusting a link according to an embodiment of the present invention, which includes a transmitting end 51 and a receiving end 52.

The transmitting end 51 is configured to determine link adjustment information according to the data traffic change when detecting a change of data traffic, adjust the number of working links on an interface of the transmitting end according to the determined link adjustment information, and send a configuration request to the receiving end 52. The configuration request includes the link adjustment information, and the link adjustment information contains the number of required working links.

The receiving end 52 is configured to adjust the number of working links on an interface of the receiving end according to the configuration request after receiving the configuration request.

When a link needs to be enabled according to the link adjustment information, the transmitting end 51 may include a detection unit 511, a link adjustment information determining unit 512, a first link adjustment unit 513, and a transmitting unit 514.

The detection unit 511 is configured to detect the data traffic change.

The link adjustment information determining unit 512 is configured to determine the link adjustment information according to the data traffic change when the change of the data traffic is detected, where the link adjustment information contains the number M of required working links.

The first link adjustment unit 513 is configured to adjust the number of working links on the interface of the transmitting end according to the determined link adjustment information, and if the number M of required working links is greater than the number N of current working links, enable M−N links.

The transmitting unit 514 is configured to send the configuration request to the receiving end, where the configuration request includes the link adjustment information.

In addition, in order to improve reliability, the transmitting end 51 may further include a first confirming unit configured to confirm whether all links work normally before the link adjustment information is determined, and if a failed link appears, determine the number of normal working links. In this embodiment, the number of normal working links is at least 1.

The link adjustment information determining unit 512 may include a link adjustment information determining submodule and a validity detection module.

The link adjustment information determining submodule is configured to determine the link adjustment information according to the data traffic change.

The validity detection module is configured to detect the validity of the link adjustment information, judge whether the number of required working links that is contained in the link adjustment information is smaller than or equal to the number of current available links, and when the number of required working links is smaller than or equal to the number of current available links, confirm that the link adjustment information is valid, and send the link adjustment information to the first link adjustment unit; otherwise, when the number of required working links is greater than the number of current available links, confirm that the link adjustment information is invalid, and instruct the link adjustment information determining submodule to determine the link adjustment information again.

The transmitting unit 514 may be specifically configured to insert the configuration request into a control word of a normal working link to send to the receiving end.

The receiving end 52 may include a second link adjustment unit 521, a synchronization detection unit 522, a synchronization response unit 523, an alignment detection unit 524, and an alignment response unit 525.

The second link adjustment unit 521 is configured to adjust the number of working links on the interface of the receiving end according to the configuration request after the configuration request is received, and if the number M of required working links is greater than the number N of current working links, enable the M–N links.

The synchronization detection unit 522 is configured to perform synchronization detection on the M links after the M–N new links are enabled. The synchronization detection unit 522 may be specifically configured to perform the synchronization detection on padding words sent on the M–N newly enabled links after the M–N new links are enabled by using the transmitting end 52.

The synchronization response unit 523 is configured to continuously return a link synchronization response to the transmitting end 52, where the link synchronization response contains currently synchronized link information.

The alignment detection unit 524 is configured to detect, in a preset period T, whether a same synchronization word appears in the M working links at the same moment, and when the same synchronization word is detected in the M working links at the same moment for a preset number S of times, complete alignment detection.

The alignment response unit 525 is configured to send a link alignment response to the transmitting end 52.

Correspondingly, the transmitting unit 514 of the transmitting end 51 may be further configured to: send the padding words on the M–N newly enabled links for the receiving end 52 to perform the synchronization detection after the M–N new links are enabled; when the currently synchronized link information received for a preset number of times is the number M of required working links, insert the synchronization word into the M working links in the preset period T; and after the link alignment response is received, indicate the transmitting unit 514 to distribute data to the M working links, and stop inserting the synchronization word into the M working links.

In order to avoid data transmission errors, the receiving end 52 may further include: a CRC check unit configured to instruct the second link adjustment unit 521 to adjust the number of working links after the configuration request is received, perform CRC check on the configuration request and when the CRC check is correct.

When at least one newly enabled link fails, the link cannot be synchronized at the receiving end 52, so that the currently synchronized link information received by the transmitting end 51 is always smaller than the number M of required working links. The transmitting end 51 may further include an alarm unit configured to: send an alarm indication indicating removal or repair of the failed link if in a preset time segment t; the currently synchronized link information received by the transmitting end 51 is always smaller than the number M of required working links.

Figure 6:
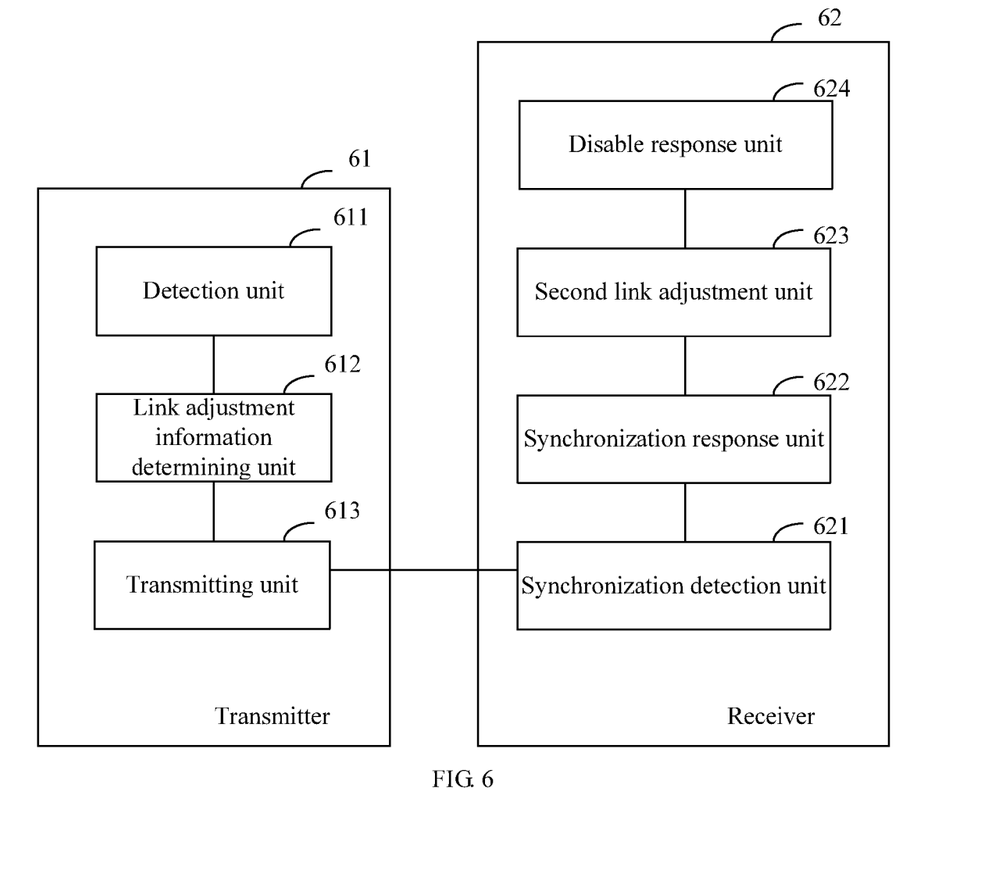
FIG. 6 is a schematic structural diagram of a second system embodiment in the present invention.

FIG. 6 shows another embodiment of a system for dynamically adjusting a link according to an embodiment of the present invention, which includes a transmitting end 61 and a receiving end 62.

The transmitting end 61 is configured to determine link adjustment information according to the data traffic change when detecting a change of data traffic, adjust the number of working links on an interface of the transmitting end 61 according to the determined link adjustment information, and send a configuration request to the receiving end 62. The configuration request includes the link adjustment information, and the link adjustment information contains the number of required working links.

The receiving end 62 is configured to adjust the number of working links on an interface of the receiving end 62 according to the configuration request after receiving the configuration request.

When a link needs to be disabled according to the link adjustment information, the transmitting end 61 may include a detection unit 611, a link adjustment information determining unit 612, and a transmitting unit 613.

The detection unit 611 is configured to detect the data traffic change.

The link adjustment information determining unit 612 is configured to determine the link adjustment information according to the data traffic change when the change of the data traffic is detected, where the link adjustment information contains the number M of required working links.

The transmitting unit 613 is configured to send the configuration request to the receiving end 62, where the configuration request includes the link adjustment information. The transmitting unit 613 may be specifically configured to insert the configuration request into a control word of a normal working link to send to the receiving end 62.

The link adjustment information determining unit 612 may include a link adjustment information determining submodule and a validity detection module.

The link adjustment information determining submodule is configured to determine the link adjustment information according to the data traffic change.

The validity detection module is configured to detect the validity of the link adjustment information, judge whether the number of required working links that is contained in the link adjustment information is smaller than or equal to the number of current available links, and when the number of required working links is smaller than or equal to the number of current available links, confirm that the link adjustment information is valid, and send the link adjustment information to the first link adjustment unit; otherwise, when the number of required working links is greater than the number of current available links, confirm that the link adjustment information is invalid, and instruct the link adjustment information determining submodule to determine the link adjustment information again.

In addition, in order to improve reliability, the transmitting end 61 may further include a first confirming unit configured to confirm whether all links work normally before the link adjustment information is determined, and if a failed link appears, determine the number of normal working links. In this embodiment, the number of normal working links is at least 1.

The receiving end 62 may include a synchronization detection unit 621, a synchronization response unit 622, a second link adjustment unit 623, and a disable response unit 624.

The synchronization detection unit 621 is configured to perform synchronization detection on the M links after the configuration request is received.

The synchronization response unit 622 is configured to continuously return a link synchronization response to the transmitting end 61, where the link synchronization response contains currently synchronized link information. The M links are normal working links, and are in a synchronization state; therefore, the currently synchronized link information continuously returned from the receiving end 62 to the transmitting end 61 is the number M of required working links.

The second link adjustment unit 623 is configured to stop receiving data from the link, and disable the link when padding words are successively received for a preset number of times on a link.

The disable response unit 624 is configured to continuously send a link disable response to the transmitting end 61, where the link disable response contains the number of current normal working links.

Correspondingly, the transmitting unit 613 of the transmitting end 61 may be further configured to: stop distributing data to N–M links to be disabled when the currently synchronized link information received for a preset number of times is the number M of required working links, and send the padding words on the N–M links to be disabled; and when the number of current normal working links that is contained in the link disable response received by the transmitting end 61 for a preset number of times is the number M of required working links, disable the N–M links to be disabled. The number M of required working links is smaller than the number N of current working links.

In order to avoid data transmission errors, the receiving end 62 may further include a CRC check unit configured to perform CRC check on the configuration request after the configuration request is received, and when the CRC check is correct, instruct the synchronization detection unit 621 to perform the synchronization detection on the M links.

Figure 7:
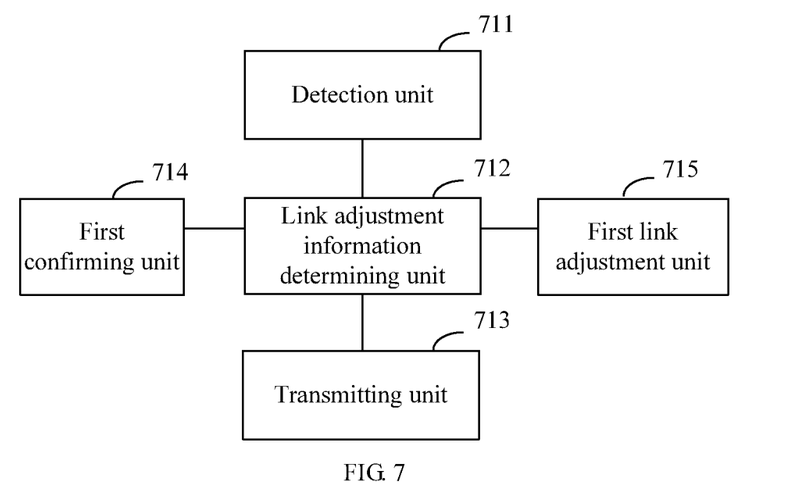
FIG. 7 is a schematic structural diagram of an apparatus embodiment in the present invention.

As shown in FIG. 7, an embodiment of the present invention further provides an apparatus for dynamically adjusting a link, which includes: a detection unit 711 configured to detect a data traffic change; a link adjustment information determining unit 712 configured to determine link adjustment information according to the data traffic change when the change of the data traffic is detected, where the link adjustment information contains the number M of required working links; and a transmitting unit 713 configured to send a configuration request to a receiving end, so that the receiving end is capable of adjusting the number of working links on an interface of the receiving end according to the configuration request, where the configuration request includes the link adjustment information; where the transmitting unit 713 may be specifically configured to insert the configuration request into a control word of a normal working link to send to the receiving end.

In addition, in order to improve reliability, the apparatus may further include a first confirming unit 714 configured to confirm whether all links work normally before the link adjustment information is determined, and if a failed link appears, determine the number of normal working links. In this embodiment, the number of normal working links is at least 1.

The apparatus may further include: a first link adjustment unit 715 configured to adjust the number of working links on an interface of the transmitting end according to the determined link adjustment information, and if the number M of required working links is greater than the number N of current working links, enable M–N links, where M is the number of required working links, N is the number of current working links, M>N, N≥1, and M–N is the number of the newly enabled links.

The transmitting unit 713 is further configured to send padding words on the M links for the receiving end to perform synchronization detection after the M–N new links are enabled; when the currently synchronized link information received for a preset number of times is the number M of required working links, insert a synchronization word into the M working links in a preset period T for the receiving end to perform alignment detection; and after the link alignment response is received, indicate the transmitting unit 713 to distribute data to the M working links, and stop inserting the synchronization word into the M working links. Alternatively, the transmitting unit 713 is further configured to stop distributing data to N–M links to be disabled when the currently synchronized link information received for a preset number of times is the number M of required working links, and send the padding words on the N–M links to be disabled for disabling links by the receiving end; and when the number of current normal working links that is contained in the link disable response received by the transmitting end for a preset number of times is the number M of required working links, disable the N–M links to be disabled, where the number M of required working links is smaller than the number N of current working links, M is the number of required working links, N is the number of current working links, M<N, M≥1, and N–M is the number of the newly disabled links.

The link adjustment information determining unit 712 may include: a link adjustment information determining submodule configured to determine the link adjustment information according to the data traffic change; and a validity detection module configured to detect the validity of the link adjustment information, judge whether the number of required working links that is contained in the link adjustment information is smaller than or equal to the number of current available links, and when the number of required working links is smaller than or equal to the number of current available links, confirm that the link adjustment information is valid, and send the link adjustment information to the first link adjustment unit; otherwise, when the number of required working links is greater than the number of current available links, confirm that the link adjustment information is invalid, and instruct the link adjustment information determining submodule to determine the link adjustment information again.

In addition, the apparatus may further include an alarm unit configured to send an alarm indication indicating removal or repair of the failed link if in a preset time segment t; the currently synchronized link information received by the apparatus is always smaller than the number M of required working links.

Figure 8:
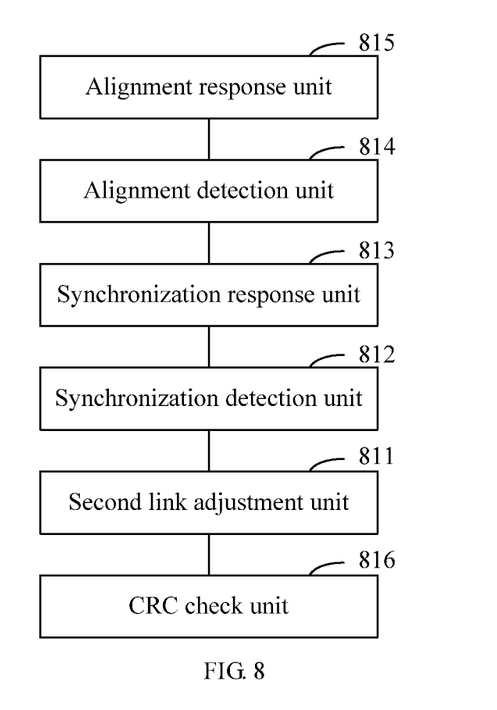
FIG. 8 is a schematic structural diagram of an apparatus embodiment in the present invention.

As shown in FIG. 8, an embodiment of the present invention further provides an apparatus for dynamically adjusting a link, which includes: a second link adjustment unit 811 configured to: after a configuration request sent by a transmitting end is received, adjust the number of working links on an interface of the receiving end according to the configuration request, and if the number M of required working links is greater than the number N of current working links, enable M−N links, where the configuration request includes link adjustment information determined by the transmitting end according to a data traffic change when detecting the change of the data traffic, the link adjustment information contains the number of required working links, and M is the number of required working links, N is the number of current working links, M>N, N≥1, M−N is the number of the newly enabled links; a synchronization detection unit 812 configured to perform synchronization detection on the M links after the M−N new links are enabled; a synchronization response unit 813 configured to continuously return a link synchronization response to the transmitting end, where the link synchronization response contains currently synchronized link information; an alignment detection unit 814 configured to detect, in a preset period T, whether a same synchronization word appears in the M working links at the same moment, and when the same synchronization word is detected in the M working links at the same moment for a preset number S of times, complete alignment detection; and an alignment response unit 815 configured to send a link alignment response to the transmitting end.

The apparatus may further include: a CRC check unit 816 configured to instruct the second link adjustment unit to adjust the number of working links after the configuration request is received, perform CRC check on the configuration request and when the CRC check is correct.

Figure 9:
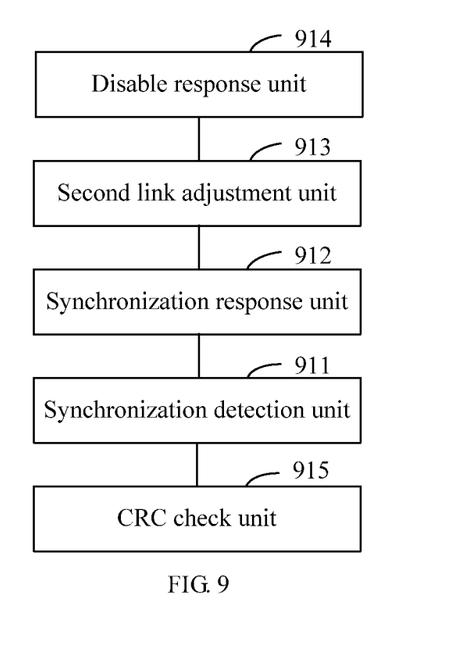
FIG. 9 is a schematic structural diagram of an apparatus embodiment in the present invention.

As shown in FIG. 9, an embodiment of the present invention further provides an apparatus for dynamically adjusting a link, which includes: a synchronization detection unit 911 configured to perform synchronization detection on M links after a configuration request sent by a transmitting end is received, where the configuration request includes link adjustment information determined by the transmitting end according to a data traffic change when detecting the change of the data traffic, and the link adjustment information contains the number of required working links; a synchronization response unit 912 configured to continuously return a link synchronization response to the transmitting end, where the link synchronization response contains currently synchronized link information; a second link adjustment unit 913 configured to stop receiving data from the link, and disable the link when padding words are successively received for a preset number of times on a link; and a disable response unit 914 configured to continuously send a link disable response to the transmitting end, where the link disable response contains the number of current normal working links.

The apparatus may further include a CRC check unit 915 configured to perform CRC check on the configuration request after the configuration request is received, and when the CRC check is correct, instruct the synchronization detection unit 911 to perform the synchronization detection.

Persons of ordinary skill in the art may understand that, the processes of the methods of the foregoing embodiments may be implemented by programs instructing relevant hardware, and the program may be stored in a readable storage medium. When the program is run, corresponding steps in the foregoing methods are performed. The storage medium may be a read only memory (ROM)/random access memory (RAM), a magnetic disk, an optical disk, and so on.

The foregoing descriptions are merely exemplary embodiments of the present invention. It should be noted that, persons of ordinary skill in the art may make various improvements and modifications without departing from the principle of the present invention. All such improvements and modifications shall fall within the protection scope of the present invention.

The invention claimed is:

1. A method for dynamically adjusting a link, comprising:
   determining, by a transmitting end, link adjustment information according to a data traffic change when detecting a change of data traffic, wherein the link adjustment information contains the number of required working links;
   adjusting, by the transmitting end, the number of working links on an interface of the transmitting end according to the determined link adjustment information;
   sending, by the transmitting end, a configuration request to a receiving end, wherein the configuration request comprises the link adjustment information;
   enabling M−N links, by the receiving end, according to the configuration request, wherein M is the number of required working links, N is the number of current working links, M>N, N≥1, and M−N is the number of newly enabled links;
   performing, by the receiving end, synchronization detection on the M links after enabling the M−N new links;
   continuously returning, by the receiving end, a link synchronization response to the transmitting end, wherein the link synchronization response contains currently synchronized link information; and
   detecting, by the receiving end in a preset period T, whether a same synchronization word appears in the M working links, completing alignment detection when detecting the same synchronization word in the M working links at the same moment for a preset number S of times, and sending a link alignment response to the transmitting end, wherein S>1,
   the method further comprising:
   sending, by the transmitting end, padding words on the M−N newly enabled links after enabling the M−N new links, wherein the padding words are used by the receiving end to detect the synchronization detection;
   inserting the synchronization word into the M working links in the preset period T when the currently synchronized link information received by the transmitting end for a preset number of times is the number M, wherein the synchronization word is used for the receiving end to perform link alignment detection;
   distributing, by the transmitting end, data to the M working links after receiving the link alignment response; and
   stopping inserting the synchronization word into the M working links,
   the method comprising:
   presetting T; and
   sending an alarm indication indicating removal or repair of a failed link when in the preset time segment T the currently synchronized link information received by the transmitting end is always smaller than the number M of required working links.

2. The method according to claim 1, further comprising stopping, by the receiving end, returning the link alignment response after detecting that sending of the synchronization word is stopped.

3. The method according to claim 1, further comprising:
setting a timer at the transmitting end;
setting a maximum time of link adjustment; and
returning to determine the link adjustment information according to the data traffic change again when link adjustment fails to be completed in the maximum time of link adjustment.

4. A method for dynamically adjusting a link, comprising:
determining, by a transmitting end, link adjustment information according to a data traffic change when detecting a change of data traffic, wherein the link adjustment information contains the number of required working links;
adjusting, by the transmitting end, the number of working links on an interface of the transmitting end according to the determined link adjustment information;
sending, by the transmitting end, a configuration request to a receiving end, wherein the configuration request comprises the link adjustment information; and
adjusting, by the receiving end, the number of working links on the interface of the receiving end according to the configuration request;
wherein adjusting the number of working links on the interface of the receiving end according to the configuration request comprises:
performing, by the receiving end, synchronization detection on M links after receiving the configuration request, wherein M is the number of required working links;
continuously returning a link synchronization response to the transmitting end, wherein the link synchronization response contains currently synchronized link information; and
stopping, by the receiving end, receiving data from the link when padding words are successively received for a preset number of times on the link;
disabling the link; and
continuously sending a link disable response to the transmitting end, wherein the link disable response contains the number of current normal working links.

5. The method according to claim 4, wherein adjusting the number of working links on the interface of the transmitting end according to the determined link adjustment information comprises:
stopping distributing data to N−M links to be disabled when the currently synchronized link information received by the transmitting end for a preset number of times is the number M of working links;
sending the padding words on the N−M links to be disabled; and
disabling the N−M links to be disabled when the number of current normal working links that is contained in the link disable response received by the transmitting end for a preset number of times is the number M of working links, wherein M<N, wherein M≥1, and wherein N−M is the number of the newly disabled links.

6. The method according to claim 1, further comprising sending the configuration request, the link synchronization response, or the link alignment response to the receiving end by inserting them into a control word of a normal working link.

7. The method according to claim 6, wherein the configuration request, the link synchronization response, or the link alignment response is an 8-bit field, and the format is:

| Bit 7 | Bit 6 | Bit 5 | Bit 4 | Bit 3 | Bit 2 | Bit 1 | Bit 0 |
|---|---|---|---|---|---|---|---|
| Reserved | Instruction code | | | Link information. | | | |

8. The method according to claim 1, further comprising:
confirming whether all links work normally before determining the link adjustment information; and
determining the number of normal working links when a failed link appears.

9. The method according to claim 1, wherein adjusting the number of working links on the interface of the receiving end according to the configuration request comprises:
performing, by the receiving end, a cyclic redundancy check (CRC) on the configuration request after receiving the configuration request; and
when the CRC check is correct, adjusting the number of working links on the interface of the receiving end according to the configuration request.

10. The method according to claim 1, further comprising:
detecting validity of the link adjustment information;
judging whether the number of required working links that is contained in the link adjustment information is smaller than or equal to the number of current available links; and
confirming that the link adjustment information is valid when the number of required working links is smaller than or equal to the number of current available links; and
adjusting the number of working links on the interface of the transmitting end when the number of required working links is smaller than or equal to the number of current available links;
confirming that the link adjustment information is invalid when the number of required working links is greater than the number of current available links; and
determining the link adjustment information again when the number of required working links is greater than the number of current available links.

11. A system for dynamically adjusting a link, comprising a transmitter and a receiver,
wherein the transmitter comprises:
a processor,
a memory storing a program instructions to be executed in the processor, the program instructions comprising a plurality of units, the plurality of units comprising:
a detection unit, configured to detect a data traffic change;
a link adjustment information determining unit, configured to: when the change of the data traffic is detected, determine link adjustment information according to the data traffic change, wherein the link adjustment information contains the number M of required working links;
a first link adjustment unit, configured to adjust the number of working links on an interface of the transmitting end according to the determined link adjustment information;
a sending unit, configured to: send a configuration request to the receiving end, wherein the configuration request comprises the link adjustment information; after the M−N new links are enabled, send padding words on the M links for the receiving end to perform the synchronization detection; when currently synchronized link information received for a preset number of times is the number M of required working links, insert a synchronization word into the M working links in a preset period T for the receiving end to perform alignment detection; and after a link alignment response is received, indicate the sending unit to distribute data to the M working links, and stop inserting the synchronization word into the M working links; and an alarm unit, configured to: if in a preset time segment t, currently synchronized link information received by the apparatus is always smaller than the number M of required working links, send an alarm indication indicating removal or repair of a failed link, wherein the receiver comprises:

a processor, a memory storing a program instructions to be executed in the processor, the program instructions comprising a plurality of units, the plurality of units comprising:

a second link adjustment unit, configured to: after a configuration request sent by a transmitting end is received, adjust the number of working links on an interface of the receiving end according to the configuration request, and if the number M of required working links is greater than the number N of current working links, enable M−N links, wherein the configuration request comprises link adjustment information determined by the transmitting end according to a data traffic change when detecting the change of the data traffic, the link adjustment information contains the number of required working links, and M is the number of required working links, N is the number of current working links, M>N, N≥1, M−N is the number of the newly enabled links;

a synchronization detection unit, configured to: after the M−N new links are enabled, perform synchronization detection on the M links;

a synchronization response unit, configured to continuously return a link synchronization response to the transmitting end, wherein the link synchronization response contains currently synchronized link information;

an alignment detection unit, configured to detect, in a preset period T, whether a same synchronization word appears in the M working links at the same moment, and when the same synchronization word is detected in the M working links at the same moment for a preset number S of times, complete alignment detection; and an alignment response unit, configured to send a link alignment response to the transmitting end.

12. A system for dynamically adjusting a link, comprising a transmitter and a receiver, wherein the transmitter comprises:

a processor, a memory storing a program instructions to be executed in the processor, the program instructions comprising a plurality of units, the plurality of units comprising:

a detection unit, configured to detect a data traffic change;

a link adjustment information determining unit, configured to: when the change of the data traffic is detected, determine link adjustment information according to the data traffic change, wherein the link adjustment information contains the number of required working links;

a first link adjustment unit, configured to adjust the number of working links on an interface of the transmitting end according to the determined link adjustment information; and a sending unit, configured to send a configuration request to the receiving end, wherein the configuration request comprises the link adjustment information, wherein the receiver comprises:

a processor, a memory storing a program instructions to be executed in the processor, the program instructions comprising a plurality of units, the plurality of units comprising:

a synchronization detection unit, configured to: after a configuration request sent by a transmitting end is received, perform synchronization detection on M links, wherein the configuration request comprises link adjustment information determined by the transmitting end according to a data traffic change when detecting the change of the data traffic, and the link adjustment information contains the number of required working links;

a synchronization response unit, configured to continuously return a link synchronization response to the transmitting end, wherein the link synchronization response contains currently synchronized link information;

a second link adjustment unit, configured to: when padding words are successively received for a preset number of times on a link, stop receiving data from the link, and disable the link; and a disable response unit, configured to continuously send a link disable response to the transmitting end, wherein the link disable response contains the number of current normal working links.

* * * * *